United States Patent [19]

Flamm

[11] Patent Number: 5,117,103
[45] Date of Patent: May 26, 1992

[54] CIRCUIT FOR OPTOELECTRONIC POSITIONING TAP

[75] Inventor: Jürgen Flamm, Bahlinghen, Fed. Rep. of Germany

[73] Assignee: Litef GmbH, Freiburg im Breisgau, Fed. Rep. of Germany

[21] Appl. No.: 571,335

[22] Filed: Aug. 23, 1990

[30] Foreign Application Priority Data

Oct. 9, 1989 [EP] European Pat. Off. ........ 89118727.0

[51] Int. Cl.$^5$ .............................................. G01D 5/34
[52] U.S. Cl. ................................... 250/229; 250/208.2; 250/214 A
[58] Field of Search ................ 250/208.2, 210, 221, 250/229; 340/709

[56] References Cited

U.S. PATENT DOCUMENTS 4,607,159  8/1986  Goodson et al. ................ 250/221
4,748,323  5/1988  Holiday ............................ 250/229
4,994,669  2/1991  Stern ................................ 250/229

FOREIGN PATENT DOCUMENTS 263261   4/1988  European Pat. Off. .
2311676  9/1974  Fed. Rep. of Germany .
3720294  9/1988  Fed. Rep. of Germany .
3709614  10/1988  Fed. Rep. of Germany .

Primary Examiner—David C. Nelms
Assistant Examiner—T. Davenport
Attorney, Agent, or Firm—Elliott N. Kramsky

[57] ABSTRACT

Optoelectronic positioning tap circuit arrangements of the type in which a beam from a light source irradiates two adjacently arranged diodes connected at their cathode ends and further including an element that is perpendicularly movable with respect to the beam path to partially shade the beam and supply a signal proportional to the difference between the diode currents, such signal characterizing the position of the shading element in the light beam. Sensitivity is increased by utilizing both diode currents to achieve a deflection-proportional output signal by short-circuit current meansurement. Existing current sum points are decoupled as each of the (three) terminals of the series diode circuit is connected to a single current/voltage converter stage. The current sum is directly detected at the input of the voltage converter stage that is connected to the (coupled) cathodes to control the operating point of the light source.

7 Claims, 3 Drawing Sheets

CIRCUIT FOR OPTOELECTRONIC POSITIONING TAP

BACKGROUND

1. Field of the Invention

The present invention relates to electronic circuit arrangements. More particularly, this invention pertains to a novel circuit for an optoelectronic positioning tap.

2. Description of the Prior Art

Optoelectronic positioning tap arrangements find extensive application in accelerometers and gyroscopes. A known type of circuit of this type is described in DE 37 20 294 C1 and illustrated in FIG. 1.

The circuit of FIG. 1 includes a pair of closely-spaced (approximately 25 μm) light-sensitive diodes D1 and D2. The diodes D1 and D2 are preferably located on the same chip and a controllable light flux is applied thereto that is generated by a light source such as a light-emitting diode (LED). Under the actuation of the light flux, the diodes supply oppositely-directed currents I1 and I2 that flow through load resistors R1, R2.

The current I1 is a function of the brightness H of the light flux emitted by the light source LED. I1 is compared with a constant current $I_s$ at a node S1 and the resultant current difference $\Delta I_s = I_s - I1$ is then applied to an integrating amplifier V2 that generates a control voltage $U_{SI} = 1/C \int \Delta I_s dt$. The brightness H is thus corrected via a transistor T so that I1 is equalized to $I_s$.

In the event that I1 is less than $I_s$ at the node S1, the control voltage $U_{SI}$ at the integrating amplifier V2 will decrease (greater negative value) and the brightness H of the light flux will increase until I1 equals $I_s$. Thus, a state of equilibrium always occurs at the node S1 independent of temperature, component variation or other asymmetries. That is, I1 equals the constant value of $I_s$.

The diodes D1 and D2 are connected in a differential arrangement and generally integrated on a single chip, exhibiting identical properties so that I2 equals I1. At a further node S2, the difference $\Delta I_D = I_2 - I_k$ is formed that is driven to zero with uniform irradiation of the diodes D1 and D2. Since no current $\Delta I_D$ flows, the output voltage $U_A = \Delta I_D \cdot R_A$ is also zero.

When a shading element such as a so-called shadow rod St, that symmetrically covers part of the light receiver areas of the diodes D1 and D2, is located in the light flux H (i.e. between the light source LED and the diodes D1 and D2) the currents I1 and I2 will remain constant despite the fact that the active diode areas have become smaller since the brightness H is corrected to exceed the integrating amplifier V2.

If the shading element is deflected, the active area of the diode D1 is reduced and that of the diode D2 increased (or vice versa). Accordingly, a current difference $\Delta I_D = I_2 - I_k$ is produced at the node S2, that generates the output voltage $U_A$ via a resistor $R_A$ of the current/voltage converting amplifier V1. I1 is maintained constant as before. That is, I1 equals $I_s$, a constant value.

The prior art controlling circuit arrangement makes it possible largely to eliminate temperature influences, component variations and production tolerances in the positioning tap. However, the circuit according to FIG. 1 includes some fundamental shortcomings and other that lead to error influences in the circuit implementation. The most significant weaknesses of the circuit of FIG. 1 include:

(1) Only the signal of the diode D2 is evaluated to obtain the voltage $U_A$ that is positionally proportional to the shadow rod St. The signal of the diode D1 is not considered and therefore only half of the sensitivity of the optical position tap is utilized.

(2) The reaction of the current/voltage converter and amplifier V2 to the output voltage $U_A$ is not considered. The offset voltage and offset voltage drift of the real amplifier $V_2$, however, can falsify the output voltage $U_A$ and lead to zero errors and zero error drift. (This can be verified by the following: The amplifier V2 is coupled via the resistors R1 and R2 to provide a gain in accordance with the ratio of $-R_A/(R1+R2)$. Since $R_A$ greatly exceeds (R1+R2) to achieve a high voltage gradient of $U_A$, this error influence can be considerable. The use of the prior art circuit in, for example, highly accurate gyroscopes and accelerometers, is not possible or is greatly restricted.)

(3) The load resistors R1 and R2 load the diodes D1 and D2. Since only the short circuit current of a photodiode is strictly proportional to the intensity of illumination H, the load resistors R1 and R2 must be equal to zero to achieve the best linearity. Accordingly, the prior art circuit of FIG. 1 is not operable to achieve a pure short circuit current measurement since $R_1 = R_2 = 0$ would mean an infinitely large error coupling from the amplifier V2 to the output voltage $U_A$·($-R_A/(R_1/+R_2) \to \infty$ for $(R_1+R_2) \to 0$.

SUMMARY AND OBJECTS OF THE INVENTION

It is therefore an object of the present invention to achieve a circuit arrangement for an optoelectronic positioning tap of greater sensitivity.

Another object of the invention is to achieve a circuit arrangement for an optoelectronic positioning tap that eliminates zero error drifts.

Yet another object of the invention is to achieve a circuit arrangement for an optoelectronic positioning tap that insures strict proportionality between intensity of illumination and output signal.

The present invention achieves the foregoing and other objects by providing an improvement in an optoelectronic positioning tap circuit of the type in which a beam from a light source irradiates a pair of adjacent light-sensitive diodes connected at their cathode ends and which includes an element that is movable in a direction perpendicular to the beam path to partially shade the light beam and in which a signal proportional to the difference between diode currents characterizes the position of the shading element relative to the light beam and the current of the light source is determined by an amplifier whose operating point is controlled with reference to a fixed potential by an integrating amplifier whose input is formed by the difference between a constant reference current and a diode current-dependent signal. The improvement includes first and second current/voltage converter stages. Each of such stages is directly connected to the anode end of one of the diodes while the integrating amplifier is directly connected to the common cathode end of the diodes. An equivalent diode configuration utilises common anode connection.

The foregoing and additional features and advantages of this invention will become further apparent from the detailed description that follows. This written description is accompanied by a set of drawing figures in which numerals, corresponding to those of the written description, point to features of the invention. Like numerals refer to like features throughout both the written description and the drawings.

DETAILED DESCRIPTION

Figure 1:
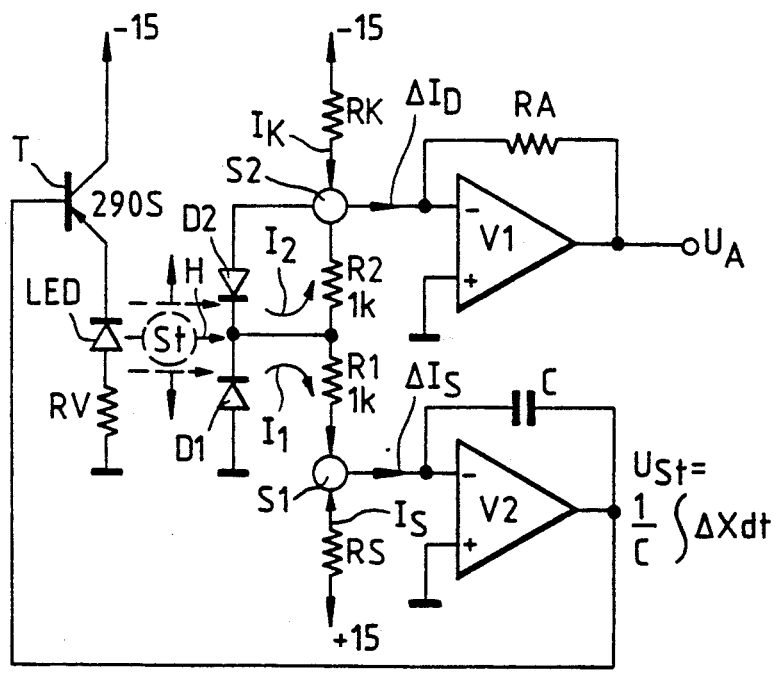
FIG. 1 is a schematic diagram of an optoelectronic positioning tap circuit in accordance with the prior art.
Figure 2:
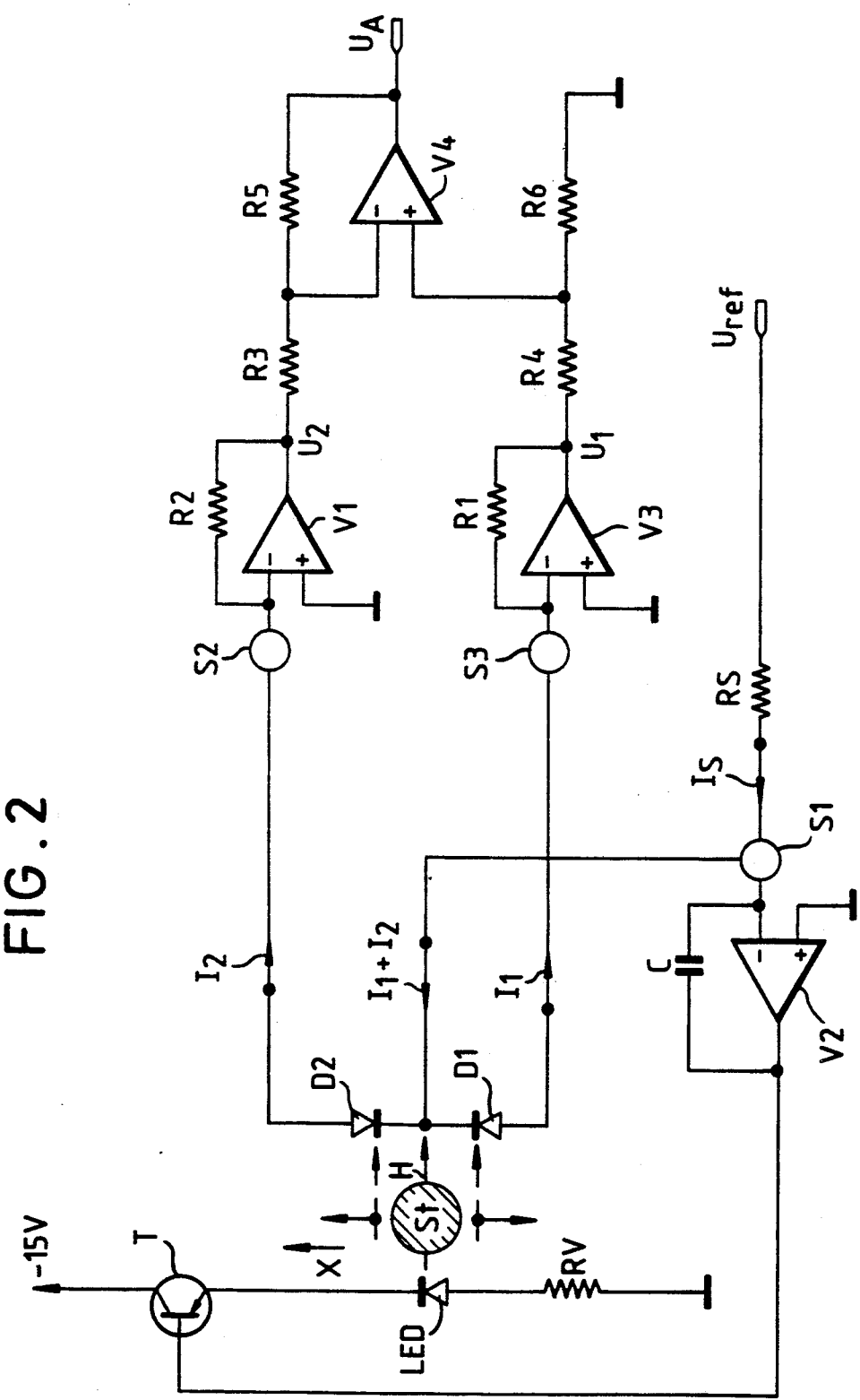
FIG. 2 is a schematic diagram of an optoelectronic positioning tap circuit in accordance with the invention in which the sum of the two diode currents is utilized to control the operating point and the output signal is determined as the difference between two diode current proportional voltages.
Figure 3:
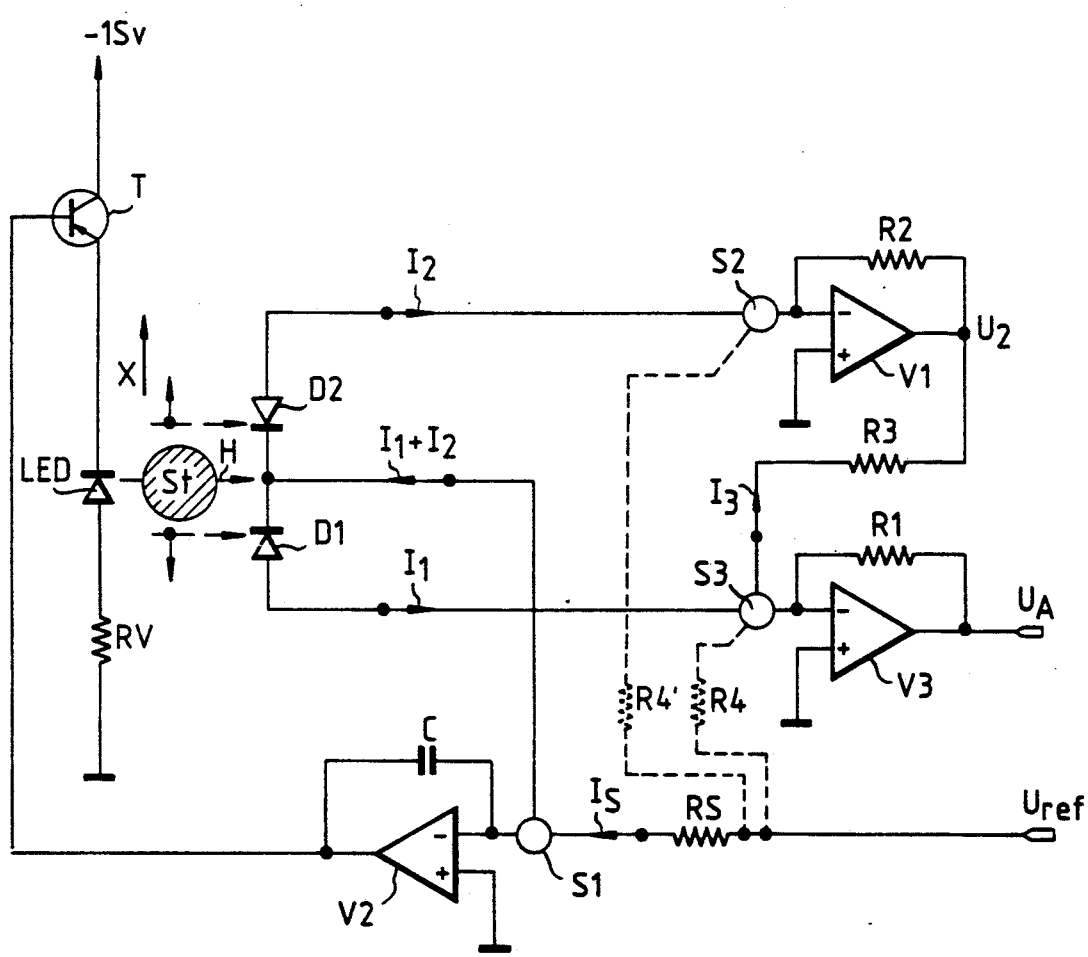
FIG. 3 is a schematic diagram of an optoelectronic positioning tap circuit in accordance with an alternative embodiment of the invention in which the output current is formed directly by forming the difference between the two currents at the input of a current/voltage converter coupled to the anode of one of the diodes.

FIGS. 2 and 3 are schematic diagrams of optoelectronic positioning tap circuits in accordance with the invention. In these figures, corresponding components and circuit points already described with reference to FIG. 1 are identified by the same reference numerals for purposes of comparison.

In both cases of the circuits according to FIGS. 2 and 3, direct detection of the sum of the diode currents at the common cathode (i.e. $I_S = (I_1 + I_2)$) is implemented to control the operating point. Since the diode currents $I_1$ and $I_2$ change in opposite directions when the shadow rod St is moved, the sum $(I_1 + I_2)$ equals the predetermined constant operating point current $I_S$ independent of movement of the shadow rod St.

According to the teachings of the invention, the anode of each of the diodes D1 and D2 is directly connected (not through load resistors as in FIG. 1) to a current/voltage converter (both FIG. 2 and FIG. 3). On the other hand, the (connected) cathodes of the diodes D1 and D2 are directly connected to the control signal input of a current/voltage-converting integrating amplifier which, analogous to FIG. 1, is also connected through resistor RS to a reference voltage source $U_{ref}$ that feeds a constant input operating current $I_S$.

In the embodiment of FIG. 2, the output voltage $U_A$ is formed in a known manner (compare, for example, DE-A-23 11 676 and DE-A-35 09 915) as the difference of the voltages $U_1$ and $U_2$ which are proportional to the currents $I_1$ and $I_2$, respectively.

In contrast, in the embodiment according to FIG. 3 the output voltage $U_A$ is obtained by means of the amplifier chip $V_3$ by forming the difference between the currents $I_1$ and $I_3$ directly at the input of the current/voltage converter connected to the anode of the diode D1. Accordingly, the current difference $(I_1 - I_3)$ supplies the output voltage $U_A$ via the resistor R1 and the slope of the characteristic of the linear output voltage $U_A$ can be adjusted by the resistor R1. A configuration in which the current difference at the input of the current/voltage converter connected to the anode of the diode D2 is formed by means of the amplifier chip V1 is equivalent to the arrangement shown in FIG. 3 apart from a sign reversal with unchanged diode connection.

In the circuits according to FIGS. 2 and 3, the full sensitivity of the optoelectronics is utilized by evaluating the two diode currents $I_1$ and $I_2$ for forming $U_A$.

While forming the output voltage $U_A$ in the circuit according to FIG. 2 as a difference between the voltages $U_1 - U_2$) will be readily apparent to those skilled in the art, a mathematical proof follows for the circuit of FIG. 3.

The following applies to the circuit of FIG. 3:

$$U_2 = -I_2 R_2 \tag{1}$$

$$I_3 = -U_2/R_3 = -I_2 R_2/R_3 \tag{2}$$

$$U_A = -(I_1 - I_3) \cdot R_1 = R_1 (R_2/R_3 \, I_2 - I_1) \tag{3}$$

$$I_1 + I_2 = I_S \tag{4}$$

Equation (4) is obtained in accordance with the operation of the operating point control loop as described in DE 37 20 294 Cl.

When the shadow rod St is moved by a distance $\Delta X$, the diode currents $I_1$ and $I_2$ change proportionally to $\Delta X$ by $\Delta$. Starting with the zero point ($\Delta X = 0$), I1 increases and $I_2$ decreases (or conversely depending on the direction of movement).

The following holds true for $I_1$ and $I_2$:

$$I_1 = I_{10}(1 - \Delta) \tag{5}$$

$$I_2 = I_{20}(1 + \Delta) \tag{6}$$

Where $I_{10}$ and $I_{20}$ are the diode currents for $\Delta X = 0$ (see equation (8) and equation (9)). The sum of $I_1$ and $I_2$ becomes $$I_1 + I_2 = I_{10} + I_{20} + \Delta(I_{20} - I_{10}) \tag{7}$$

which is independent of movement of the shadow rod St for $I_{10} = I_{20}$.

The condition $I_{10} = I_{20}$ is always satisfied due to the symmetry of the optical arrangement.

The following is obtained with equation (4):

$$I_{10} = I_S/2 \tag{8}$$

$$I_{20} = I_S/2 \tag{9}$$

Inserting equations (5) and (6) into equation (3), it follows that:

$$U_A = R_1 (R_2/R_3 \, I_{20}(1+\Delta) - I_{10}(1-\Delta)) \tag{10}$$

$$U_A = R_1 (R_2/R_3 \, I_{20} - I_{10}) + R_1 (R_2/R_3 \, I_{20} + I_{10})\Delta \tag{11}$$

and with equations (8) and (9), it also holds that:

$$U_A = R_1 (R_2/R_3 - 1) I_S/2 + R_1 I_S/2 (R_2/R_3 + 1)\Delta \tag{12}$$

with $$R_2/R_3 = 1 \tag{13}$$

it finally hold that:

$$U_A = R_1 I_S \Delta \tag{14}$$

The procedure for calibrating the circuit is analogous to that for the circuit of FIG. 1 (cf. column 4, from line 25, DE-A-37 20 294).

A small error voltage at the output of the amplifier V3 (at $\Delta X = 0$) is corrected by bipolar adjustment of U2 or I3 by means of the resistor R2 or R3 without an additional resistor. An additional resistor R4 or R4' permits a correction current from the reference voltage source to be alternatively fed in at sum point S3 or S2. Thus, a simplified bipolar calibration is possible using the reference voltage $U_{ref}$ for setting a stable operating point.

This second calibration possibility can also be employed in the circuit of FIG. 2.

The slope of the output voltage $U_A$ is set by the resistor R1. Alternatively, the operating current $I_S$ can be used to set the slope by means of the reference voltage $U_{ref}$ or the resistor $R_S$. This type of calibration is used in the circuit of FIG. 2.

Thus, both circuit embodiments can be calibrated in a very simple manner that utilizes the full sensitivity of the optical element by evaluating both diode currents, decoupling the signal path for obtaining the output voltage $U_A$ from the operating point controller and enabling a genuine short-circuit current measurement to be performed. An improvement in linearity is accordingly achieved. The operating point is controlled by the sum $(I_1+I_2)$ of the two diode currents which is independent of the position of the shadow rod St.

Monolithic quad amplifiers may be employed, limiting additional expenditure to only 3 resistors in the circuit of FIG. 2 as opposed to that of FIG. 1, while the circuit of FIG. 3 requires no real additional expenditure.

The invention is based on the concept of connecting current/voltage converter stages to each of the three terminals of the diodes D1 and D2 to eliminate the disadvantages of the prior art circuits including insufficient sensitivity, influences of an offset voltage drift and insufficient linearity of the output signal as a function of the intensity of diode illumination. The special advantage of the circuit design employing current/voltage converter stages is the negligible input impedance of such stages. As a result, a loadless genuine short circuit current measurement is effected and the individual current sum points S1, S2 and S3 are decoupled.

The doubled sensitivity that results from direct detection of the two diode currents (I1 and I2) to obtain the output signal and direct detection of the diode current sum (I1+I2) to control the operating point constitute further advantages of the invention.

By contrast, in the prior art the current of only one diode is utilized to generate the position signal in a comparable known circuit arrangement (see e.g., report by Y. Netzer, "Linear light polarizers sense angular position" in Electronics, Oct. 12th, 1978, page 146 to 148) using a moving polarizer as a shading element. The circuit of FIG. 1 makes no provision for a short circuit current measurement with direct detection of the sum currents for controlling the operating point. In addition, coupling exists between the signal path and the operating point controller in the circuit of FIG. 1.

In the optoelectronic displacement pick-up according of EP-A-0 263 261 and the optoelectronic position tap of DE-A-2 311 676 or DE-A-35 09 915, the output signal $U_A$ is determined from the difference between two individual voltages. However, in spite of considerable circuit expenditure, only a single diode is utilized to obtain the signal and the operating point of the light source is not determined from the sum of the currents flowing through the diodes. This correspondingly applies to circuit arrangements intended for similar purposes, having in each case a different type of shading element, in accordance with printed documents DE-A-26 06 434 and DE-A-36 36 266 or DE-A-37 09 614.

Thus it is seen that the present invention provides an optoelectronic positioning tap circuit that achieves greater sensitivity, eliminates zero error drifts and insures strict proportionality between intensity of illumination and output signal. While this invention has been disclosed with reference to its presently preferred embodiment, it is not limited thereto. Rather, this invention is limited only insofar as defined by the following set of claims and including within its scope all equivalents thereof.

What is claimed is:

1. In an optoelectronic positioning tap circuit of the type in which a beam from a light source irradiates a pair of linearly adjacent light-sensitive diodes connected at their cathode ends, which includes an element that is movable in a direction perpendicular to the beam path to partially shade said light beam, in which a signal proportional to the difference between diode currents characterizes the position of said shading element relative to said light beam, and in which the current of said light source is determined by an amplifier, the operating point of which is controlled with reference to a fixed potential by an integrating amplifier, whose input is formed by the difference between a constant reference current and a diode current-dependent signal, the improvement comprising:
   a) a first and a second current/voltage converter stage arranged to provide the circuit output signal;
   b) each of said first and second current/voltage converters is directly connected to the anode end of one of said diodes; and
   c) said integrating amplifier is directly connected to the connected cathode ends of said diodes.

2. A circuit as defined in claim 1 further characterized in that the circuit output signal is the difference between the outputs of said current/voltage converter stages.

3. A circuit as defined in claim 1 further characterized in that said circuit output can be picked up at the output of one of said current/voltage converter stages so that the input to said current/voltage converter stage comprises the difference between the current flowing through the anode end of the diode connected to said current/voltage converter stage and the output of the current/voltage converter stage directly connected to the anode of the other diode.

4. A circuit as defined in claim 3 further comprising:
   a) a resistor for adjusting the slope of the characteristic of said output voltage; and
   b) said resistor is connected from the output of said current/voltage converter stage that supplies said output voltage to its current signal input.

5. A circuit as defined in claim 3 further including:
   a) an adjusting resistor for bipolar calibration of the current/voltage converter connected to the anodes of said diodes; and
   b) said adjusting resistor is located in the current path of the output current for forming said difference.

6. A circuit as defined in claim 3 further including:
   a) an adjusting resistor for bipolar calibration of said current/voltage converter connected to the anodes of said diodes; and
   b) said adjusting resistor is connected from the output to the input of the current/voltage converter connected to the anode of one diode.

7. A circuit as defined in claim 3 further including:
   a) an adjusting resistor for bipolar calibration of the current/voltage converter connected to the anodes of said diodes; and
   b) said adjusting resistor is connected from a reference voltage source to the current signal input of one of said current/voltage converter stages.

* * * * *